United States Patent [19]

Lindland et al.

[11] Patent Number: 4,739,146
[45] Date of Patent: Apr. 19, 1988

[54] METHOD FOR APPLYING A WELD BEAD TO A THIN SECTION OF A SUBSTRATE

[75] Inventors: Dag Lindland, Eatontown; Gary Shubert, Lakewood, both of N.J.

[73] Assignee: Metallurgical Industries, Inc., Tonton Falls, N.J.

[21] Appl. No.: 833,213

[22] Filed: Feb. 25, 1986

[51] Int. Cl.⁴ .............................................. B23K 9/00
[52] U.S. Cl. ...................... 219/121 PY; 219/121 PL; 219/76.16; 219/77
[58] Field of Search ....................... 219/76.14, 76.15, 219/76.16, 77, 75, 74, 121 PS, 121 PL, 121 PY, 121 PK; 427/34

[56] References Cited

U.S. PATENT DOCUMENTS

| | | | |
|---|---|---|---|
| 3,016,447 | 1/1962 | Gage et al. | 219/76.15 |
| 3,071,678 | 1/1963 | Neely et al. | 219/76.16 |
| 3,405,247 | 10/1968 | Hlivka | 219/76.15 |
| 4,162,389 | 7/1979 | Shimdada et al. | 219/121 PW |
| 4,536,640 | 8/1985 | Vukanovic | 219/121 PL |

*Primary Examiner*—M. H. Paschall
*Attorney, Agent, or Firm*—Kenyon & Kenyon

[57] ABSTRACT

The welding method is used to lay down weld beads on metallic substrates with a thin section, e.g., of down to 0.030 inch. The process employs a plasma transferred arc which is generated at low current, e.g., between 0.5 amps and 60 amps, and with a very high switching frequency, e.g., 15 KHz at the power supply. A low amount of heat is generated so that the thin section is not burned through. The surfacing powder is delivered into the arc and becomes metallurgically bonded to the substrate.

25 Claims, 2 Drawing Sheets

METHOD FOR APPLYING A WELD BEAD TO A THIN SECTION OF A SUBSTRATE

This invention relates to a method and apparatus for applying a weld bead to a thin section of substrate and to an article of manufacture made thereby.

Heretofore, various techniques have been known for applying coating to a substrate. For example, plasma spray techniques have been known wherein a high amperage welding arc is established between the torch anode and cathode. Coating powders are accelerated into the plasma column to become semi-molten and thereafter impinged at very high velocities onto the substrate. Since the high velocity powder particles come to rest on the substrate, the energy of the particles is dissipated as heat so that the particles tend to flow plastically onto the substrate. However, such plasma spray processes do not provide a metallurgical bond between the coating material and the substrate. Hence, where the substrate is subsequently subjected to tension or torsion forces, the coating material tends to separate from the substrate.

Another known technique is to have a plasma welding arc created between a welding torch and a workpiece under high amperage, for example, from 50 amps upward, and approaching the 500 to 600 amp range at various times, depending upon the application. In such cases, the surface of the workpiece is heated to a molten state to form a pool of molten metal. Thereafter, a weld powder is directed into the pool in order to melt therein and form a weld bead upon solidification. Generally, these tecnhiques cannot be used on workpieces having thin sections as the heat generated by the welding arc would burn through the thin sections.

As is also known, various types of structures having relatively thin sections, which are subjected to wear during use and which must be replaced or rebuilt from time to time. For example, various types of air seals have been known for use in many turbine engines, in which a number of individual segments form a continuous ring about a rotor having turbine or compressor blades thereon. During use, these seals are subjected to wear and abrasion due to contacting of the ends of the segments against each other as well as contacting of the turbine blades with these segments as the blades rotate at very high revolutions per minute. In addition, because of the heat generated and the centrifugal force, the turbine blades elongate or stretch and, in doing so, tend to wear grooves and notches in the seal segments and eventually wear the segments. Generally, these segments are classified by degree of wear or the amount of material which has been removed from the original dimensions, with several classifications of wear being usable in the engines. However, as the wear between the turbine blades and the segments becomes greater and greater, the segments are replaced with new parts or parts which have been rebuilt in some fashion. If the parts are not replaced, the efficiency of the engine suffers dramatically. In the past, many methods have been attempted to rebuild the seal segments. For example, one method which has been attempted relies upon a plasma spray technique in which various materials are deposited in multiple layers so as to obtain a desired thickness. However, a plasma spray technique generally deposits a very thin thickness for each pass, e.g., only a few thousandths of an inch per pass. Consequently, as many as 50 or 60 passes may be required to build up the thickness desired. Further, since the coating is not metallurgically bonded to the seal segment, separation may occur due to any cyclic loading of the segments. That is, each segment is subjected to compression and tension due to the vibration of the engine and the pressure of a turbine blade across the segment. For example, during scraping by a blade, a segment is placed in compression and when the blade passes the point of contact, the pressure is suddenly released and the segment may be subjected to tension. In addition, temperature variations within the engine can cause the material to separate from the base material. While such failures may not necessarily be catastrophic to the engine, these failures can cause engine failure.

It has also been suggested to braze honeycomb sections of high temperature and corrosion-resistant material to the ring seal segments. However, the application of such a structure is economically limited.

Accordingly, it is an object of the invention to be able to apply a weld bead on a thin section of a substrate in an economical manner.

It is another object of the invention to provide a thin section of a substrate with a metallurgically bonded weld bead.

It is another object of the invention to use low amperage in forming a weld bead on a substrate.

It is another object of the invention to rebuild wear surfaces on ring seals in an economical manner.

It is another object of the invention to provide a relatively simple welding technique for applying weld beads on thin sections in a rapid, economical manner.

Briefly, the invention provides a method and apparatus of applying a weld bead to a thin section of a substrate as well as an article of manufacture made thereby.

In accordance with the method, a plasma arc is generated between an electrode and a substrate having a thin section under a current of low amperage with superimposed high frequency stabilization of the power supply which is sufficient to melt a surface of the substrate into a pool of molten metal without burning through the substrate. In addition, a controlled amount of surfacing powder is delivered into the plasma arc at a point slightly above the molten pool for preheating prior to being delivered to the molten pool on the substrate. The surfacing powder may also be entrained in a carrier gas for delivery into the plasma arc. The delivered powder and molten pool are thereafter permitted to solidify into a weld bead which is characterized in being metallurgically bonded to the substrate.

In addition, an inert gas shield surrounds the plasma column, and is provided to protect the molten metal pool from atmospheric contamination or oxidation.

The power supply and the control of the powder and gas feed allows a deposit of a highly controlled overlay on the thin substrate with a minimum amount of dilution and a minimum amount of distortion of the substrate.

With the process, it has been found unnecessary to utilize high amperages to melt significant quantities of overlay material. Instead, the heat input is precisely controlled and made more effective so as to melt the delivered powder instead of melting and distorting the substrate. In this regard, the amperage is precisely controlled and the plasma column is focused on the subsrate. For example, the amperage may be in a range of from 0.5 amps to 75 amps. However, for purposes of applying a weld bead on thin sections, the amperage is in a preferred range of from 0.5 amps to 60 amps. In addition, there is a precise control of the delivery of the powder into the plasma arc and, thus, delivery to the weld puddle by a control of the amount of gas flow in and around the arc.

The process may be employed to build up weld beads on substrates approaching 0.030 inches in thickness with deposits having thicknesses, for example, not in excess of 0.125 inches.

The process is not limited to simply building up existing materials. For example, the process may also be used for applying various wear-resistant deposits including formulations of materials which have refractory carbides or other wear and abrasion-resistant particles. As such, the process can be used to make a very high wear-resistant or possibly a cutting surface, depending upon the degree of alloying which is allowed to take place, as well as the amount of carbide employed in terms of size and location within a deposit.

The power supply for the process may be an inverter power supply with a switching frequency of 15,000 cycles per second (15 KHz). Because of the high switching rate, a more effective power output can be obtained for a given amperage input. This, in turn, achieves a significant cost savings with regards to electrical consumption.

By reducing the amount of amperage, the torch to a workpiece distance can be reduced. By reducing this the position of the welding arc and the position of the heat input to the substrate can be focused or pinpointed. This, in turn, permits the area into which the powder is to be deposited to be accurately defined. Thus, the powder delivery can be made into the welding arc slightly above the substrate so that a more effective use of the heat of the arc can be made to melt the powder without dissipating the entire heat of the arc into the substrate.

The apparatus for applying the weld bead includes a welding torch having an orifice for constricting a plasma column, a power source connected to the torch to provide the welding current, means for delivering a controlled amount of surfacing powder into the welding arc and means for delivering a controlled flow of carrier gas to entrain the surfacing powder for delivery into the welding arc. In addition, means are provided for delivering a controlled flow of shielding gas to the torch for emission about the welding arc.

The invention also provides an article of manufacture which is comprised of a metal substrate having a section of thin thickness and a wide surface as well as a weld bead metallurgically bonded to the surface of the substrate. In addition, the weld bead may be sufficiently ductile so as to withstand bending stresses without separating from the substrate.

The invention also provides a metal ring seal segment, for example, for an air seal, which is comprised of a substrate having a curved, thin section and a weld bead overlay metallurgically bonded to and over the curved thin section.

These and other objects and advantages of the invention will become more apparent from the following detailed description taken in conjunction with the accompanying drawings wherein.

Figure 1:
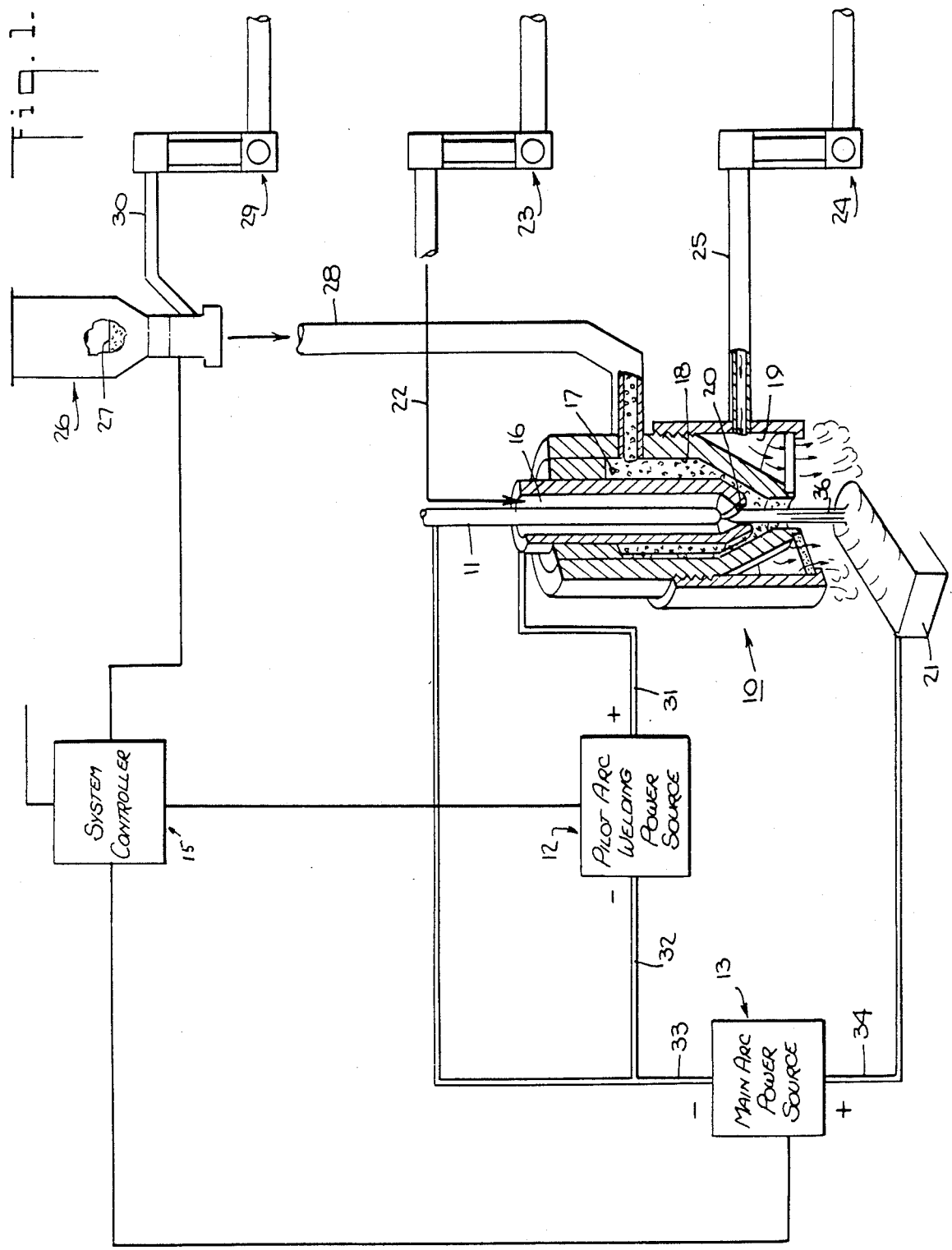
FIG. 1 illustrates a schematic view of an apparatus for applying a bead to a thin section substrate in accordance with the invention.

The torch 10 includes a first central passage 16 for receiving the electrode 11, a second passage 17 concentric to and about the first passage 16 for receiving a flow of powdered metal 18 and a third passage 19 concentric to and about the second passage for receiving a flow of shielding gas. In addition, the torch 10 has a restricting orifice 20 at the end of the central chamber 16 through which flow of inert gas is directed towards a workpiece or substrate 21.

As indicated in FIG. 1, a gas line 22 is connected to the central chamber 16 of the torch in order to delivery an inert gas, such as argon, thereto. The gas line 22 is, in turn, connected to a gas flow control and metering device 23 which has an inlet gas line connected to a suitable inert gas source (not shown). This device 23 serves to control and meter the amount of inert gas delivered into the central chamber 16 of the torch 10.

In like manner, a flow control and metering device 24 is connected via a gas line 25 to the outer chamber 19 of the torch 10 in order to deliver a shielding gas, such as argon, thereto from a suitable shielding gas source (not shown).

Still further, a powdered metal deliver device 26 which contains a reservoir of powdered metal material 27 is connected via a gas line 30 to the powdered metal delivery device 26 in order to convey an inert gas into the supply line 28 from a suitable source (not shown) in order to aid the conveyance of the powdered metal. The gas delivered to the delivery device 26 is used to assist gravity in transporting the powdered metal to and through the torch 10 while also protecting the powdered metal from atmospheric contamination. This gas also adds to the overall gas volume and composition at the weld zone.

The pilot arc welding power source 12 is connected to and between the electrode 11 and the restricting orifice 20 by suitable cables 31, 32 respectively, and internal connections (not shown) within the torch 10. The pilot arc welding power source 12 provides the welding current necessary to establish an electric arc between the electrode 11 and the restricting orifice 20. As indicated, the electrode 11 is connected to the negative terminal of the power source 12 while the restricting orifice 20 of the torch 10 is connected to the positive terminal of the power source 12.

The main arc power source 13 is connected to and between the electrode 11 and the substrate 21 via cables 33, 34, respectively, in order to provide the welding current to establish an arc between the electrode 11 and the substrate 21. As indicated, the electrode 11 is connected to the negative terminal of the power source 13 while the substrate 21 is connected to the positive terminal of the power source 13.

The main arc power source 13 may be a Dimetrics Centaur which is provided with suitable means to adjust the amperage to relatively low values, for example from 0.5 amps to 75 amps. In addition, the power source 13 is provided with electronic switching mechanisms which stabilize the welding arc, for example, by operating the power source 13 at a switching frequency of 15 KHz. This allows the DC current arc to maintain stability under the low amperage output.

The system controller 15 is connected to the respective power sources 12, 13, the powdered metal delivery device 26 and the various flow control and metering devices 23, 24, 29 in order to synchronize the operation of these components.

The substrate 21 has a section of thin thickness, for example in the range of from 0.030 inches to 0.10 inches. In addition, the substrate has a relatively wide surface relative to the thickness on which a weld bead is to be formed.

In operation, with powdered metal material being supplied under gravity from the delivery device 26 to the torch 10 and with gas being directed to the passages 16, 19 at relatively low velocities, the power sources 12, 13 are activated so that a transferred arc is established between the electrode 11 and substrate 21. At the same time, a plasma plume 36 of the inert gas supply through the passage 16 is formed between the electrode 11 and substrate 21. The delivered powdered metal is fed into this plume 36 and transferred in semi-molten form onto the wide surface of the substrate 21 to form a weld bead. The delivery of the powdered material is precisely metered by the device 26 while the gas delivered from the outer passage 19 shields the weld zone from atmospheric contamination while adding to the overall gas volume and composition at the weld zone. As the torch 10 and electrode 11 are moved along the length of the substrate 21, a weld puddle is formed on the substrate 21 and the consumable powdered material which is delivered into the puddle is fused in place. Of note, a very minimum puddle is created while the powder passing into the puddle is already in a semi-molten state. Hence, the amount of heat introduced into the substrate 21 is at a minimum so that the chances of possible burning through the substrate 21 are reduced. Likewise, associated heat affected zones in the substrate 21 and distortions due to welding are reduced.

All of the process variables may be controlled; however, under servo control or feedback control only two process parameters are currently monitored and controlled, that is, the amperage and the voltage of the main arc power source 13. Desirable control features to be placed under servo control would be such things as gas flows so that not only can the gas flow desired during welding be predicted and specified but also modified as conditions dictate on the various parts. Thus, high gas flows may be had at some places and low gas flows at other places. This would be particularly important with regards to the plasma gas, in that the combination of plasma gas and amperage determine to a great extent the penetration or dilution of the substrate. Similar controls would be desirable, but not have as great a return on investment, for the powder flow gas as well as the shield gas. Another control that would be desirable is to control the powder delivery device placing that under a direct servo control so that the amount and rates of the powder feed can be varied under some type of NC or computer control. This would also permit a fixed powder feed rate to be established with a control to determine that the powder feed rate was not being exceeded.

The torch 10 may be made with a variety of orifice sizes depending upon the amperage and gas flow applications. The size of the orifices have a direct relationship to the amperage requirement so that it is not necessary to have a 0.125 inch orifice when running a very low amperage where a 0.060 inch orifice would suffice. The capability of constricting the arc, constricting the gas flow and being able to control the gas flow to a higher degree allows smaller orifice sizes to be used. In addition, the availability of having a variable or a series of various angles on the powder outlet ports of the torch become very important. Even with the inverter type power supply, an arc cannot be maintained at a great distance from the substrate at low amperages. Thus, the torch to work distance must be reduced to a distance that is suitable for the process. For example, for magnetically coupled power supplies, the distance would be approximately a half an inch (that also being typical for an SCR type power supply for amperages of 100 amps or more) down to approximately ⅜ of an inch for 50 amp arc with an inverter type power supply. When operating in the very low amperages of 10 amps and below, a quarter inch and less can be used as the stand off distance or the torch to work distance.

Figure 2:
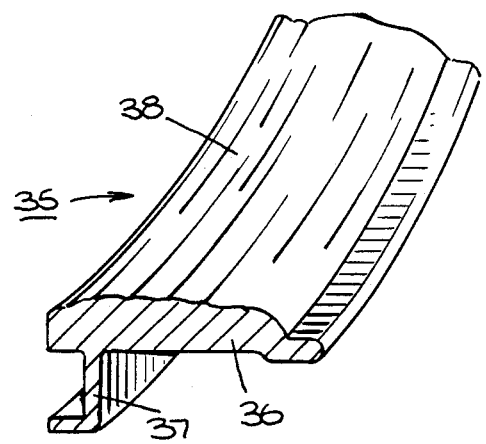
FIG. 2 illustrates a perspective view of a worn air seal ring segment.
Figure 3:
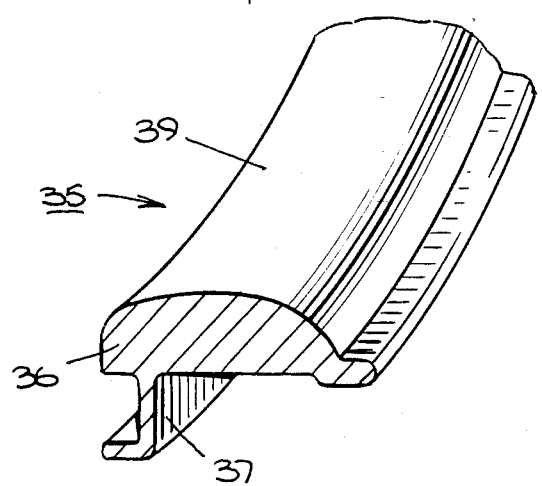
FIG. 3 illustrates a cross-sectional view of rebuilt air seal ring segment in accordance with the invention.

Referring to FIGS. 2 and 3, a specific application of the above described process will now be described with respect to building up a wear surface on a worn segment of an air seal for a turbine engine.

As is known, air ring seals for a turbo prop engine may be formed of a plurality of arcuate sections. By way of example, as shown in FIG. 2, each ring segment 35 has a cross section formed by a main body portion 36 and one or more descending L-shaped flange portions 37. The basic configuration is well known and need not be further described.

During use, the wear surface 38 becomes worn as indicated in FIG. 2 due to the scraping of the rotor blades of the engine thereon. As a result, after a degree of wear has been reached which necessitates replacement or rebuilding of the ring segment, the entire ring seal is removed from the engine. At this time, the ring segments may be placed in a circular array, for example by being mounted in a copper chill, and a weld bead formed on each segment 35 by a welding torch, for example as described above, using the above described process. In this respect, the welding torch would pass over the worn surface 38 of each ring segment to form a fused weld bead 39 thereon and would pass consecutively onto the next sgement in the copper chill.

After welding of the bead has been completed, the ring seal may then be machined to the final dimensions, and thereafter, cut into the individual segments. The end faces of each individual segment can then be worked in any suitable fashion to apply a wear-resistant surface at the end edges. Thereafter, the ring segments can be replaced in the aircraft engine.

As indicated by the cross-sectional view in FIG. 3, the weld bead 39 which is formed on the worn ring segment is metallurgically bonded to the body portion 36 of the segment 35. Hence, the weld bead 39 is able to absorb bending and torsion stressing during use without separating from the body 36. By way of example, weld beads have been applied to air ring seal segments having a radius of radius of approximately 9 inches and which are made of Inconel 625 metal. In this case, the surfacing powder is also made of the same base metal. Other metals which are usable for the weld bead include other nickel base alloys.

The invention provides a technique which can be used to deposit a wide variety of metals, metal alloys or mixtures of the metals and metal alloys along or with additions of refractory hard materials such as carbides. Of note, iron, nickel and cobalt base alloys have been deposited. For example, these have included stainless steels, high chromium irons, tool steels, cobalt chromium tungsten alloys and nickel chromium silicon boron alloys. In addition, mixtures of several of these materials with a carbide addition, e.g. tungsten carbide, titanium carbide and vanadium tungsten carbide having also been deposited. This flexibility in material selection is a major characteristic of the technique that is not enjoyed by previously known processes that use other than powder consumables.

The invention also provides a process of overlaying a substrate having a thin section which does not require the melting of significant quantities of overlaying material. Further, the electrical energy required for applying the overlay is at a minimum and substantially lower gas flows than in previously known plasma transferred arc or plasma spray processes can be used.

The invention also effects a weld bead on a metal substrate which is fully fused, i.e., metallurgically bonded to the substrate. As such, the weld bead can sustain various cyclic loadings of compression and tension as well as torsional stresses without breaking off or separating from the substrate. A relatively fine-grained structure is also obtained thereby giving a slightly harder alloy for a given chemical composition. For example, if an S6 deposit has a 42 Rockwell C the bead may have a 45 Rockwell C, average.

Further, the invention satisfies a long term need in the aerospace industry in providing a method of restoring worn parts to their original dimensions using a relatively simple and economical technique.

While the torch 10 of FIG. 1 is capable of performing the described work, the process is not limited or restricted to utilizing this torch. torches of other designs offering unique capabilities and advantages may be selected depending upon the application.

What is claimed is:

1. A method of overlying an electrically conductive substrate having a thin section thickness, said method comprising the steps of
   generating a plasma arc between an electrode and the substrate under a low current of up to 60 amps stabilized by a high switching frequency sufficient to melt a surface of the thin substrate into a pool of molten metal without burning through the substrate;
   delivering a controlled amount of surfacing powder into the arc at a point slightly above the molten pool on the substrate for delivery into the molten pool; and
   permitting the delivered powder and molten pool to solidify into a weld bead metallurgically bonded to said substrate.

2. A method as set forth in claim 1 wherein said current is in the range of from 0.5 amps to 60 amps.

3. A method as set forth in claim 1 wherein said current stabilized by a switching frequency of at least 15 KHz.

4. A method as set forth in claim 1 wherein the gas-entrained powder is delivered into the arc at a point sufficient to permit partial melting of the powder prior to entry into the pool on the substrate.

5. A method as set forth in claim 1 which further comprises the steps of entraining the surfacing powder in a carrier gas upstream of the plasma arc for delivery into the plasma arc.

6. A method as set forth in claim 5 which further comprises the steps of delivering an inert gas about the electrode to define the plasma arc between the electrode and the substrate and providing a shielding gas about the plasma arc to protect the molten pool from atmospheric contamination.

7. A method as set forth in claim 1 wherein the thin section has a thickness of not more than 0.125 inches and the weld bead has a thickness of from 0.030 to 0.125 inches.

8. A method of applying a weld bead to a thin section of an electrically conductive substrate said method comprising the steps of
   generating a plasma arc between an electrode of a welding torch and the thin section under a current of from 0.5 amps to 60 amps stabilized by a switching frequency of about 15,000 cycles per second;
   delivering a surfacing powder into said arc to partially melt the powder; and
   applying the partially melted powder in said arc into a molten pool on the thin section to form a weld bead thereon.

9. A method as set forth in claim 8 wherein the welding powder is delivered in a controlled amount and at a controlled angle into said plasma arc.

10. A method as set forth in claim 8 wherein an inert gas is delivered about the electrode to define the plasma arc.

11. A method as set forth in claim 8 which includes the step of entraining the welding powder into a carrier gas for delivery into said plasma arc.

12. A method as set forth in claim 8 wherein said thin section has a thickness of about 0.030 inches and said weld bead has a thickness not in excess of 0.125 inches.

13. A method as set forth in claim 8 wherein the welding powder includes refractory carbides.

14. A method as set forth in claim 8 wherein said arc is of a length of from ⅜ inch to ½ inches and of a diameter of from to 0.090 to 0.178 inches.

15. A method as set forth in claim 14 wherein the powder is delivered at a point slightly above the substrate and approximately at a distance 0.040 therefrom.

16. A method as set forth in claim 8 which further comprises the steps of delivering an inert gas about the electrode to define the plasma arc between the electrode and the substrate, entraining the surfacing powder in a carrier gas upstream of the plasma arc for delivering into an arc and providing a shielding gas about the arc to protect the molten pool from atmospheric contamination.

17. A method of overlaying at least one electrically conductive substrate having a thin section thickness, said method comprising the steps of
   generating a plasma arc between an electrode and the substrate under a current of from 0.5 amps to 60 amps stabilized by a switching frequency of 15 KHz to melt a surface of the substrate into a pool of molten metal;
   entraining a controlled amount of surfacing powder into a carrier gas and delivering the entraining powder into the arc at a point slightly above the molten pool on substrate; and
   permitting the delivered powder and the molten pool to solidify into a weld bead metallurgically bonded to said substrate.

18. A method as set forth in claim 17 wherein the substrate has a thickness of about 0.030 inch and the weld bead has a thickness not in excess of 0.125 inch.

19. A method of rebuilding a worn metal seal ring having a pluralityof thin sectioned segments of a thickness ofnot more than 0.125 inches and defining a circular array, said method comprising the steps of
   mounting the segments in a circular array;
   generating a plasma arc between an electrode and one of said segments under a current of low amperage of from 0.5 to 60 amps stabilized by a high switching frequency sufficient to melt a surface of said segment into a pool of molten metal without burning through said segment;

delivering a controlled amount of gas-entrained welding powder into the arc at a point above the molten pool on said one segment to partially melt the powder for depositing into the molten pool;

permitting the delivered powder and molten pool to solidify into a weld bead metallurgically bonded to said one segment; and thereafter moving the arc over the remaining segments in said circular array to form weld bands thereon.

20. A method as set forth in claim 19 wherein the plasma arc is moved over the segments continuously to form a continuous weld bead from one segment to the next segment.

21. A method as set forth in claim 20 which further includes the step of subsequently separating said segments from each other.

22. A method as set forth in claim 20 which further includes the step of machining the weld beads on said segments to a predetermined size.

23. A method as set forth in claim 20 which further includes the step of mounting said segments in a chill to dissipate heat therefrom during welding of the weld bead thereon.

24. A method of applying a weld bead to a thin section of an electrically conductive substrate of a thickness not in excess of 0.125 inches, said method comprising the steps generating a plasma arc between an electrode of a welding torch and the thin section under a current of from 0.5 amps to 60 amps stabilized by a switching frequency of about 15,000 cycles per second;

delivering a surfacing powder into said arc to partially melt the powder; and applying the partially melted powder in said arc into a molten pool on the thin section to form a weld bead thereon.

25. A method as set forth in claim 24 wherein said substrate and said surfacing powder are made of the same base metal.

* * * * *

UNITED STATES PATENT AND TRADEMARK OFFICE
CERTIFICATE OF CORRECTION

PATENT NO. : 4,739,146

DATED : April 19, 1988

INVENTOR(S) : Dag Lindland and Gary SHubert

It is certified that error appears in the above-identified patent and that said Letters Patent is hereby corrected as shown below:

```
Column 1,  line 38 cancel "and which"
Column 3,  line 26 "this" should be -this,-
Column 3,  line 27 "welding" should be -plasma-
Column 3,  line 31 "welding" should be -plasma-
Column 3,  line 43 "welding" should be -plasma-
Column 3,  line 45 "welding" should be -plasma-
Column 4,  line 8  "which flow" should be -which a flow-
Column 4,  line 11 "delivery" should be -deliver-
Column 4,  line 23 "deliver" should be -delivery-
Column 4,  line 60 "welding" should be -plasma-
Column 6,  line 24 cancel "wear"
Column 6,  line 37 "sgement" should be -segment-
Column 6,  line 67 "having" should be -have-
Column 7,  line 27 "torches" should be -Torches-
Column 8,  line 62 "pluralityof" should be -plurality of-
Column 8,  line 63 "ofnot" should be -of not-
Column 9,  line 14 "bands" should be -beads-
Column 10  line 11 "steps" should be -steps of-
```

Signed and Sealed this

Twenty-second Day of November, 1988

Attest:

DONALD J. QUIGG

*Attesting Officer*　　　　　*Commissioner of Patents and Trademarks*